3,528,880
PRODUCTION OF BIS(1,2:5,6-O-ISOPROPYLIDENE-3-O-THIOCARBONYL-α-D-GLUCOFURA-NOSE) DISULFIDE AND PAPER CONTAINING SAME
William M. Doane, Morton, and Baruch S. Shasha, Peoria, Ill., assignors to the United States of America as represented by the Secretary of Agriculture
No Drawing. Filed Aug. 8, 1967, Ser. No. 659,233
Int. Cl. C08b 19/00; C13k 9/00; D21h 3/20
U.S. Cl. 162—175  2 Claims

ABSTRACT OF THE DISCLOSURE

Quantitative yields of bis(1,2:5,6-di-O-isopropylidene-3-O-thiocarbonyl-α-D-glucofuranose) disulfide are obtained in only 1 hour from 1,2:5,6-di-O-isopropylidene-α-D-glucofuranose by reacting a DMSO solution of the latter with sodium hydroxide and carbon disulfide, cooling the resulting solution to 5° C., adding sufficient acetic acid to neutralize excess alkali, oxidatively crosslinking the resulting xanthate to the disulfide with aqueous iodine, and extracting the desired disulfide derivative with ether.

SUMMARY OF THE INVENTION

Quantitative yields of bis(1,2:5,6-di-O-isopropylidene-3-O-thiocarbonyl-α-D-glucofuranose) disulfide are rapidly obtained from 1,2:5,6-di-O-isopropylidene-α-D-glucofuranose by treating a DMSO (dimethyl sulfoxide) solution of the latter at 25° C. with aqueous sodium hydroxide and carbon disulfide, cooling the resulting solution to 5° C. before adjusting the pH to a value of about 5 with acetic acid, adding cold aqueous iodine to crosslink the xanthate, extracting the resulting brown syrup with ether, washing the extract first with thiosulfate and then with water, and then evaporating the ether to provide a crystallizable syrup.

Commonly assigned, concurrently filed, copending application S.N. 659,232 of Doane, Shasha, and Stout, discloses and claims the preparation of paper-strengthening trans cyclic carbonate and thionocarbonate derivatives of dextrin, low molecular weight dextran, and of methyl 4,6-O-benzylidene-α-D-glucopyranoside, which derivatives when added in the presence of triethylamine to a papermaker's cellulosic furnish that also contains gelatinized starch, results in the formation of internally sized handsheets that exhibit improved dry and wet strength values.

DETAILED DESCRIPTION OF THE INVENTION

This invention relates to an improved process for preparing the known compound bis(1,2:5,6-di-O-isopropylidene-3-O-thiocarbonyl-α-D-glucofuranose) disulfide which has utility as a wet strength additive for paper as well as being useful in fundamental carbohydrate research as an intermediate for the synthesis of the model compound 1,2-O-isopropylidene-α-D-glucofuranose-5,6-thiocarbonate, cf. Doane et al., J. Org. Chem. 30:162 (1965), and for the preparation of O-alkyl- or O-aryloxythiocarbonyl derivatives of 1,2:5,6-di-O-isopropylidene-α-D-glucofuranose, cf. Shasha et al., Carbohyd. Res., 6:34 (1968).

Heretofore the above disulfide has been obtained in yields amounting to only about 66 percent of theory by a process that requires about 16 hours, Doane et al., supra.

Thus, the improved process of our invention provides not only greatly improved yields of the above disulfide but also shortens the total production time to a small fraction of that previously required. Our process should also be applicable broadly for the preparation of xanthates and oxidatively crosslinked xanthates (xanthides) of various hydroxy compounds, which, like the starch xanthate of Russell et al., U.S. Pat. No. 3,160,552, may have utility as wet strength additives for paper.

The following examples will more clearly illustrate the invention.

Example 1

Fifteen grams of 1,2:5,6-di-O-isopropylidene-α-D-glucofuranose was dissolved in 15 ml. of DMSO and 15 ml. of 5 N sodium hydroxide solution was added along with 10 ml. of carbon disulfide. The momentarily yellow solution turned red almost immediately. After about 7 minutes of stirring at 25° C., the solution was cooled to 5° C. and sufficient 5 N acetic acid was added dropwise to restore a yellow color (pH about 5).

The thusly formed unstable xanthate was very promptly crosslinked by the rapid addition of cold aqueous iodine solution, resulting in the formation of a dark brown syrup layer which, after separation, was dissolved in diethyl ether. The ether solution was washed first with aqueous sodium thiosulfate, which produced a bright yellow color, and then with water. The washed ethereal layer was dried with anhydrous magnesium sulfate and then evaporated to yield 19.6 g. (100 percent of theory) of a heavy syrup which crystallized as needles of bis(1,2:5,6-di-O-isopropylidene-3-O-thiocarbonyl-α-D-glucofuranose) disulfide on standing. Following recrystallization from alcohol-water, there was no melting point depression on mixture with an authentic sample nor were there any $R_f$ differences on TLC (thin-layer chromatography) using a 9:1 ethyl acetate-carbon disulfide solvent.

Failure to cool the solution to 5° C. prior to neutralization of the solution and crosslinking the xanthate invariably lowers the yields to about 60–70 percent of theory.

Example 2

1,2:5,6-di-O-isopropylidene-α-D-glucofuranose (0.5 g.) was xanthated under the conditions mentioned above and added to 1000 ml. of a papermaker's cellulosic pulp containing 24.8 g. dry weight of fiber. The pH was adjusted to 5.6 with acetic acid, and sufficient iodine was added to convert the xanthate into bis(1,2:5,6-di-O-isopropylidene-3-O-thiocarbonyl-α-D-glucofuranose) disulfide. Since 0.5 g. of the glucofuranose starting material yields about 0.65 g. of the disulfide product, the resulting paper will contain an approximately 39 to 1 ratio of dry cellulose fiber to the disulfide. The diluent water was added to bring the final volume of the furnish to 5000 ml. The 660 ml. portions of the furnish were used to prepare standard Tappi handsheets weighing approximately 3.8 g. each. The handsheet specimens were dried at 105° to 115° C. and then tested on Tappi equipment. Wet strengths were determined after 30 minutes of soaking. The wet tensile strength was 600 meters as compared to a control of 190 meters.

When the amount of 1,2:5,6-di-O-isopropylidene-α-D-glucofuranose was increased to 2.5 g., the wet tensile strength was found to have a value of 900 meters. The resulting paper would have an approximately 8 to 1 ratio of cellulose fibers to the disulfide on a dry basis.

A nonexclusive, irrevocable, royalty-free license in the invention herein described, throughout the world for all purposes of the United States Government, with the power to grant sublicenses for such purposes, is hereby granted to the Government of the United States of America.

We claim:
1. A process of producing bis(1,2:5,6-di-O-isopropylidene-3-O-thiocarbonyl-α-D-glucofuranose) disulfide compound comprising:

(a) reacting a DMSO solution of 1,2:5,6-di-O-isopropylidene-α-D-glucofuranose with sodium hydroxide and carbon disulfide to form the corresponding xanthate in solution;
(b) cooling the resulting xanthate solution to 5° C.;
(c) adding sufficient acetic acid to the cooled xanthate solution to neutralize excess alkali;
(d) adding cold aqueous iodine solution to crosslink the xanthate;
(e) extracting the crosslinked xanthate with ether;
(f) washing the resulting ether extract with sodium thiosulfate to remove excess iodine;
(g) evaporating the resulting extract to a heavy syrup; and
(h) allowing said syrup to crystallize as needles of bis(1,2:5,6-di-O-isopropylidene - 3 - O - thiocarbonyl-α-D-glucofuranose) disulfide.

2. A paper sheet containing therein cellulose fibers and bis(1,2:5,6 - di - O - isopropylidene-3-O-thiocarbonyl-α-D-glucofuranose) disulfide, in a ratio of about 39 to 1 to about 8 to 1 on a dry weight basis, respectively.

References Cited

Journal of Organic Chemistry, 30:162 (1965), Doane et al.

S. LEON BASHORE, Primary Examiner

F. FREI, Assistant Examiner

U.S. Cl. X.R.

260—209